(12) United States Patent
Cooper

(10) Patent No.: US 9,156,149 B2
(45) Date of Patent: Oct. 13, 2015

(54) TOOLING SYSTEM AND METHOD FOR REMOVING A DAMAGED OR DEFECTIVE BUSHING

(75) Inventor: Tom Cooper, Ennis, TX (US)

(73) Assignee: Textron Innovations Inc., Providence, RI (US)

( * ) Notice: Subject to any disclaimer, the term of this patent is extended or adjusted under 35 U.S.C. 154(b) by 610 days.

(21) Appl. No.: 13/467,118

(22) Filed: May 9, 2012

(65) Prior Publication Data

US 2012/0288338 A1    Nov. 15, 2012

Related U.S. Application Data

(60) Provisional application No. 61/484,833, filed on May 11, 2011.

(51) Int. Cl.
*B23B 47/28* (2006.01)
*B25B 27/06* (2006.01)
*B23B 49/02* (2006.01)

(52) U.S. Cl.
CPC .............. *B25B 27/06* (2013.01); *B23B 47/28* (2013.01); *B23B 49/02* (2013.01); *Y10T 408/03* (2015.01); *Y10T 408/55* (2015.01); *Y10T 408/5583* (2015.01); *Y10T 408/567* (2015.01); *Y10T 408/568* (2015.01); *Y10T 408/569* (2015.01)

(58) Field of Classification Search
CPC ............ Y10T 408/567; Y10T 408/568; Y10T 408/569; Y10T 408/55; B23B 7/28; B23B 7/281; B23B 7/284; B23B 49/02
USPC ....................... 408/115 R, 72 B, 72 R, 115 B
See application file for complete search history.

(56) References Cited

U.S. PATENT DOCUMENTS

| | | | | |
|---|---|---|---|---|
| 907,735 | A | * | 12/1908 | Cain ............................... 408/97 |
| 2,232,374 | A | * | 2/1941 | Drews ....................... 408/115 R |
| 2,411,246 | A | * | 11/1946 | Clapper .................... 29/890.031 |
| 2,547,986 | A | * | 4/1951 | Van Dermark et al. ....... 29/426.4 |
| 2,670,639 | A | * | 3/1954 | Flowers et al. ................. 408/54 |
| 2,960,767 | A | | 3/1960 | Chisel |
| 3,613,212 | A | * | 10/1971 | Miller ............................. 29/726 |
| 3,775,020 | A | * | 11/1973 | Stoutenberg .............. 408/115 R |
| 4,010,943 | A | * | 3/1977 | Eft ................................ 269/87.1 |
| 4,646,413 | A | * | 3/1987 | Nall et al. .................. 29/402.03 |
| 5,415,502 | A | * | 5/1995 | Dahlin ........................ 408/72 B |
| 6,824,335 | B2 | * | 11/2004 | Lynch ....................... 408/115 R |
| 2004/0096282 | A1 | | 5/2004 | Lynch |
| 2009/0077783 | A1 | | 3/2009 | Hume |

FOREIGN PATENT DOCUMENTS

EP        0206404 A1    12/1986

OTHER PUBLICATIONS

CA Office Action dated May 5, 2014 from counterpart CA App. No. 2,776,654.

(Continued)

*Primary Examiner* — Daniel Howell
*Assistant Examiner* — Nicole N Ramos
(74) *Attorney, Agent, or Firm* — James E. Walton

(57) ABSTRACT

A system and method to remove a bushing from a bore includes an alignment tool that fits within an inner cavity of the bushing and a cutter tool aligned by the alignment tool. The method includes forming a groove on an inner surface of the bushing with the cutter tool and guiding the cutter tool with a guide associated with the alignment tool.

12 Claims, 5 Drawing Sheets

(56) References Cited

OTHER PUBLICATIONS

European Search Report dated Oct. 22, 2012 from counterpart EP App. No. 12167538.3.

Office Action dated Apr. 7, 2015 from counterpart CA App. No. 2,776,654.

Office Action dated Jun. 23, 2015 from counterpart EP App. No. 12167538.3.

* cited by examiner

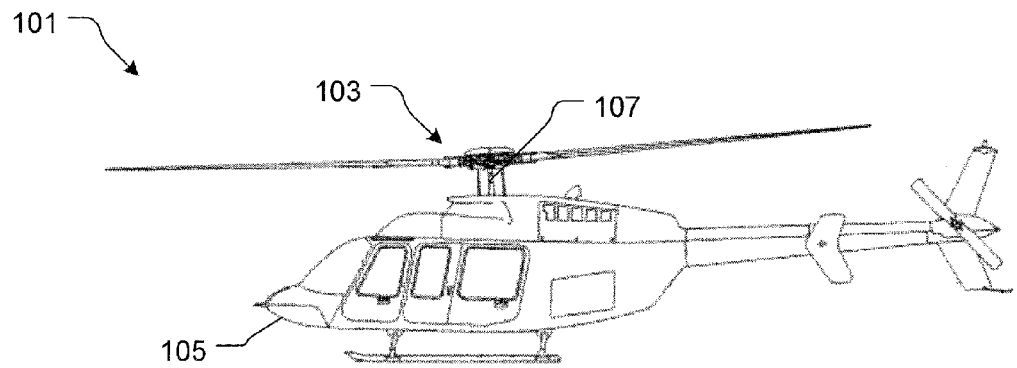
FIG. 1
(Prior Art)
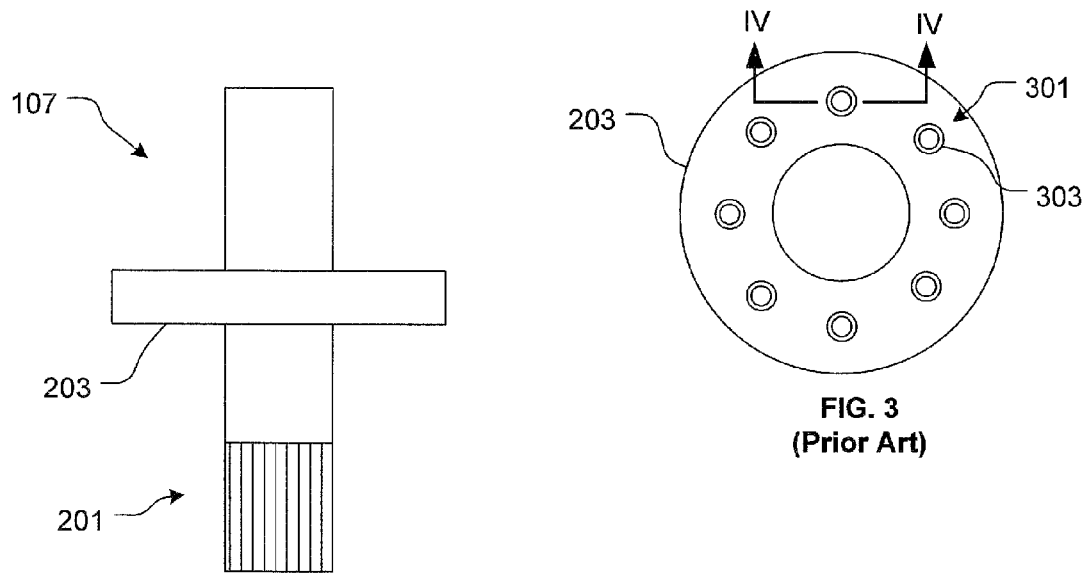
FIG. 2
(Prior Art)
FIG. 3
(Prior Art)
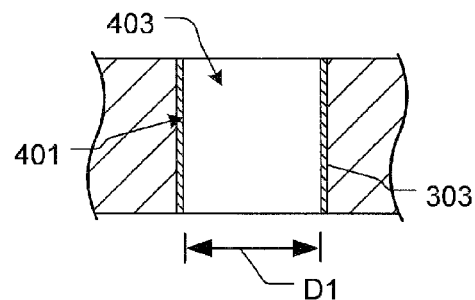
FIG. 4
(Prior Art)

TOOLING SYSTEM AND METHOD FOR REMOVING A DAMAGED OR DEFECTIVE BUSHING

CROSS REFERENCE TO RELATED APPLICATIONS

This application is a non-provisional application of U.S. Application No. 61/484,833, filed 11 May 2011, titled "Tooling System and Method for Removing a Damaged or Defective Bushing," which is hereby incorporated by reference for all purposes as if fully set forth herein.

BACKGROUND

1. Field of the Invention

The present application relates generally to tooling systems, and more particularly, to a tooling system for removing damaged or defective bushings.

2. Description of Related Art

Bushings are commonly used and well known in the art for effectively providing a protective barrier between two joining structures. In the aircraft industry, bushings are typically used with rotor masts, wherein the bushings prevent wear on the mast by one or more structures attached thereto. After extensive use, the bushings are replaced, which includes the time consuming process of disassembling the rotor assembly and thereafter setting the rotor mast on a milling machine. Conventional methods exhaust considerable time and effort, resulting in increased aircraft downtime and associated maintenance costs.

Referring now to the drawings, FIG. 1 depicts a side view of a conventional rotary aircraft 101 having a rotary system 103 carried above a fuselage 105. An aircraft engine (not shown) drives rotary system 103 via a mast 107. FIGS. 2-4 depict various views of rotor mast 107. In FIGS. 2 and 3, respective front and top views of mast 107 are shown, while FIG. 4 depicts a cross-sectional view of mast 107 taken at IV-IV of FIG. 3.

Mast 107 includes a threaded portion 201 that engages with the engine transmission (not shown) and a flange 203 having a plurality of bores 301 that secure to one or more operably associated structures. In the exemplary embodiment, bores 301 extend through the thickness of the flange and are configured to receive bushings 303. Bushing 303 have proven to be effective means for preventing wear on the inner surface of the bore 301. Damage to this surface would result in the entire mast having to be replaced, resulting in significant aircraft downtime and associated costs.

Conventional assembly methods include press fitting the bushings 303 within bores 301. The tight tolerance prevents the bushing from being removed from the bore; the removal process requires extensive machining, generally performed on a lathe, mill, or other suitable machining devices.

Although great strides have been made in the above-mentioned process for removing and replacing bushings, considerable shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 1 is a side view of a conventional rotary aircraft;

FIG. 2 is simplified front view of a rotary mast of the aircraft of FIG. 1;

FIG. 3 is a top view of the rotary mast of FIG. 2;

FIG. 4 is a cross-sectional view of a bore of the rotary mast of FIG. 3 taken at IV-IV;

Figure 5:
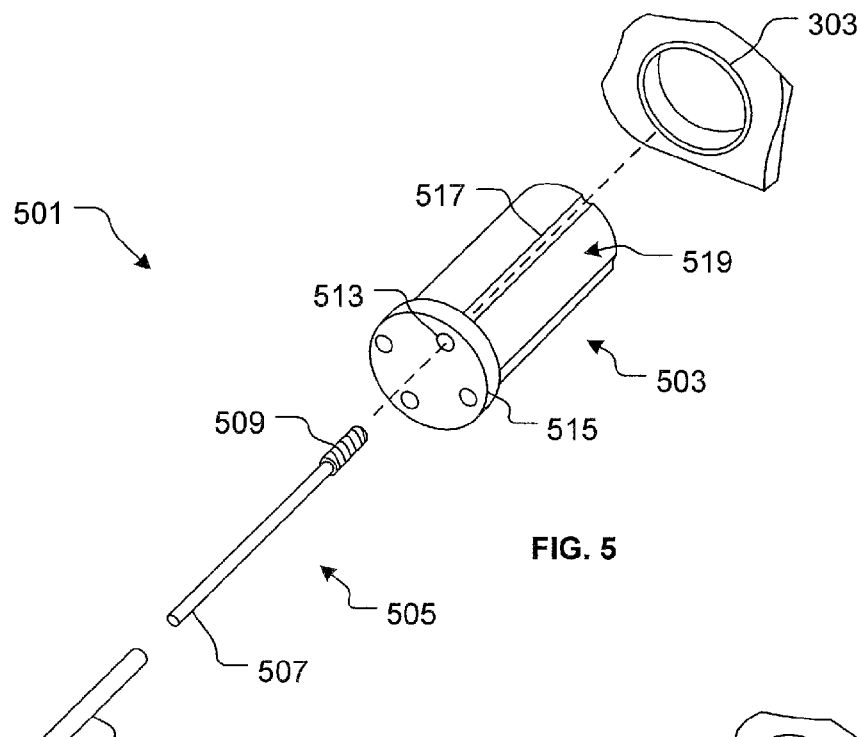
FIG. 5 is an oblique disassembled view of a tooling system according to one preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As briefly discussed above, it should be understood that bushing 303 protects an inner surface of bore 301, which if damaged, could result in the entire mast 107 having to be replaced. Thus, precision machining is required when removing the bushing 303 from bore 301 so as to prevent damage to the inner surface. The system and method of the present application overcomes common disadvantages associated with conventional tooling systems for removing bushings. Specifically, one or the unique features includes a portable tooling system, which allows easy and rapid removal of the bushing while the mast remains on the aircraft; this feature greatly reduces downtime and maintenance costs associated with the bushing removal process.

In one preferred embodiment, the tooling system includes an alignment tool tailored to fit snugly within an inner cavity 403 of bushing 303. A cutter tool associated with the alignment tool is utilized to machine a groove on the inner surface of the bushing. Due to the forces exerted on the bushings when assembled, the groove causes the bushing to collapse inwardly, which in turn allows removal of the bushing. The system provides precision machining such that the cutter tool never comes in contact with the inner surface of the bore. Further detailed discussion of these features is provided below and shown in the corresponding figures.

Figure 6:
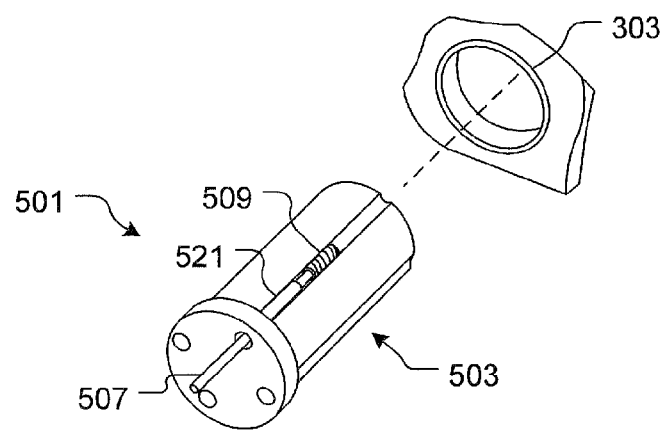
FIG. 6 is an oblique assembled view of the tooling system of FIG. 5.
Figure 7:
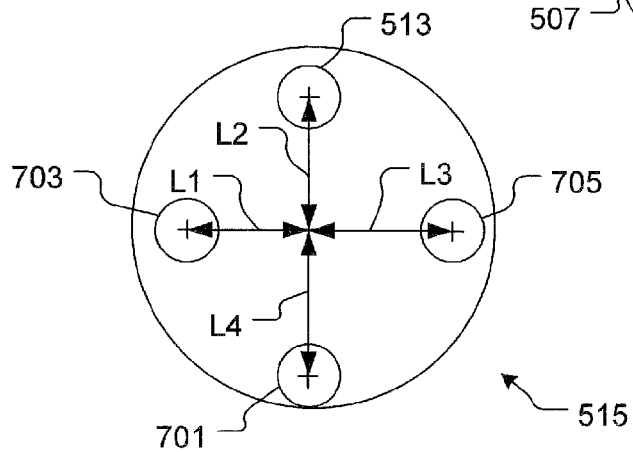
FIG. 7 is a top view of a flange of an alignment tool of the tooling system of FIG. 5.

Referring now to the remaining drawings, wherein like reference characters identify corresponding or similar elements throughout the several views, FIGS. 5-7 depict various views of the tooling system 501 according to a preferred embodiment of the present application. In the exemplary embodiments, the tooling system removes bushings from bores associated with a rotor mast; however, it will be appreciated that the features discussed herein can easily be adapted for use with other types of structures having bushings.

In FIGS. 5 and 6, oblique views of tooling system 501 are shown according to one preferred embodiment. Tooling system 501 comprises an alignment tool 503 configured to fit snugly within the inner cavity 403 of bushing 303. Alignment tool 503 receives and guides a cutter tool 505 that in turn creates a groove on the inner surface 401 of the bushing 303.

During the removal process, cutter tool 505 travels via a guide 517 running along the longitudinal length of alignment tool 503. The cutter tool 505 is configured to remove material from the inner surface of bushing 303 while traveling via guide 517, which in turn forms a groove, e.g., groove 805 (see, FIG. 8) on the inner surface 401 of bushing 303. The groove causes the bushing to slightly collapse inwardly; sufficient to allow removal of the bushing from the bore. In the exemplary embodiment, alignment tool 503 is provided with four guides; however, it will be appreciated that alternative embodiments could include more of less guides.

Alignment tool 503 has a diameter D2 (see FIG. 8) substantially equal to diameter D1 of bushing 303. When assembled, alignment tool 503 fits snugly within the inner cavity 403 of bushing 303 so as to prevent movement therein. In some embodiments, an attachment device, e.g., a C-clamp, can be utilized to secure alignment tool 503 within bushing 303.

A driver system 807, e.g., a handheld drill, attaches to section 507 of cutter tool 505 and rotates a cutter 509 that creates groove 805 along the inner surface 401 of bushing 303. The cutter 509 passes through a port 513 extending through a flange 515 of alignment tool 503 and is guided within guide 517. The guides preferably have a radius that is substantially that same as the outer curvature of the cutter 509 so as to prevent chatter and/or walking during the removal process. Tooling system 501 is further provided with a sleeve 521 that receives section 507 therethrough and configured to maintain relative alignment of cutter 509 during the machining process.

It should be appreciated that port 513, guide 517, and sleeve 521 are operably associated with one another for guiding cutter tool 505 in a direction relatively parallel with inner surface 401. This feature enables precision machining of a groove 805 on the inner surface of bushing 303. In particular, alignment tool prevents chattering and/or walking of cutter 509, which is a common and destructive problem associated with conventional milling processes for removing these types of bushings.

FIG. 7 shows a top view of flange 515. In the exemplary embodiment, four ports extend through flange 515, namely, ports 513, 701, 703, and 705. Each port is selectively positioned at different locations relative to the center of flange 515, as depicted with arrows labeled L1, L2, L3, and L4. Each port is also coaxially aligned with a respective guide. In the illustrative embodiment, the locations of each port are selectively positioned at different depths relative to surface 519. For example, L4 is furthest from the center of the alignment tool while L1 is closest. Thus, the corresponding guide associated with port 701 creates the greatest groove depth. This feature provides precision machining, wherein the worker gradually increases the depth of groove 805 on inner surface 401 by utilizing the different ports and associated guides. It should be understood that removing too much material in a single pass could cause chatter and/or walking. For this reason, four ports associated with four guides are utilized in the preferred embodiment. However, it will be appreciated that alternative embodiments could utilizes more or less ports and guides, all depending on the desired application, for example, the material composition of the bushing.

In a preferred method of machining groove 805, the worker initially passes the cutter tool through port 701 to travel along the associated guide furthest from the inner surface 401 of bushing 303. The first pass removes a small amount of material from the inner surface 401; the process is then repeated with the remaining ports/guides until a desired groove depth is created. For example, the next step includes utilizing port 513 and the associated guide. To achieve this feature, the worker simply rotates the alignment tool within the cavity of the bushing until the next guide aligns with the groove, then the process is repeated.

Figure 8:
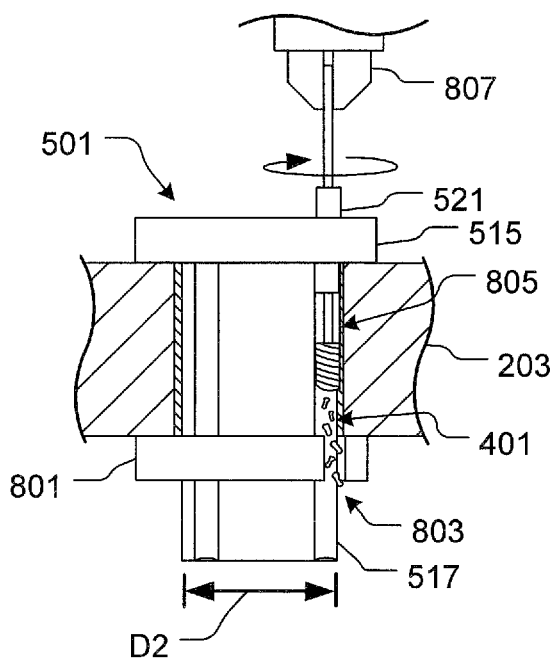
FIG. 8 is a front view of the tooling system of FIG. 5 shown within the cross-sectional view of the bore of FIG. 4.

Referring to FIG. 8 in the drawings, a front view of alignment tool 503 and a cross-sectional view of bore 301 are shown. During the machining process, a driver system rotates cutter tool 505 while the worker gradually traverses cutter tool 505 within the guide, resulting in a groove 805 on the inner surface 401 of bushing 303 (see also FIG. 10).

Tooling system 501 is further provided with an attachment device 801 that secures alignment tool 503 within bore 301. In the preferred embodiment, device 801 is a C-clamp; however, alternative embodiments could include similarly suitable devices. Attachment device 801 is provided with an opening 803 that allows debris from bushing 303 to pass therethrough.

Figure 9:
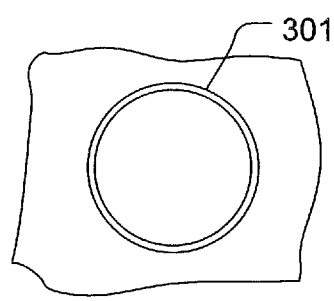
FIG. 9 is a top view of the bore of FIG. 4 having a bushing therein.
Figure 10:
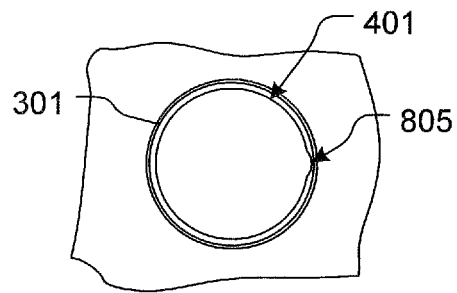
FIG. 10 is a top view of the bore of FIG. 4 after machining the bushing according to one preferred method of the present application.

FIGS. 9 and 10 show top views of bushing 303 in bore 301 prior to and after the machining process. FIG. 9 shows bushing 303 secured against inner surface 401 of bore 301, while FIG. 10 shows the effects of the machining process, specifically, the inward collapse of bushing 303 due to the formation of groove 805.

Figure 11:
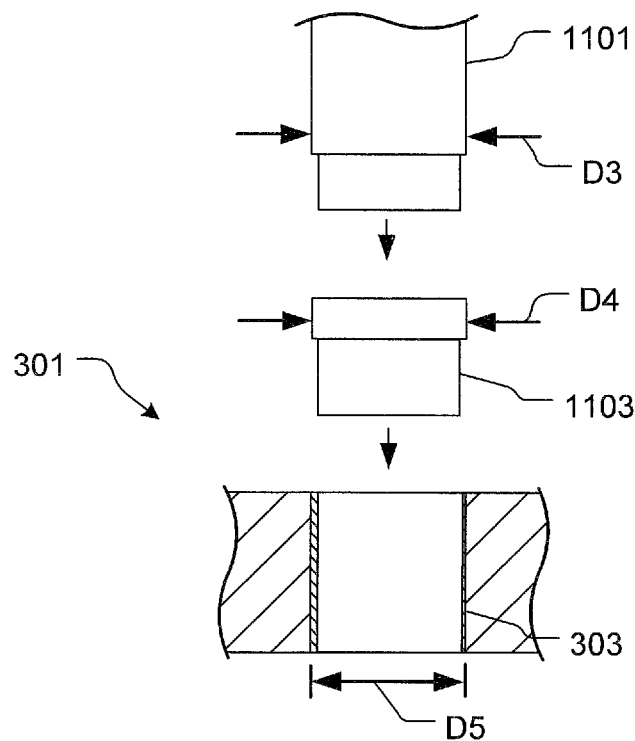
FIGS. 11-13 are front views depicting the preferred method of removing the bushing from the bore with a driver tool.
Figure 12:
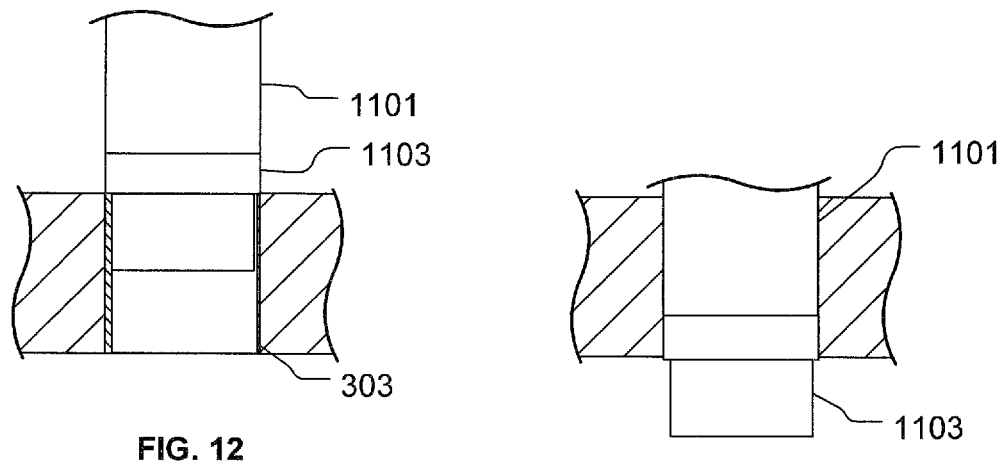
Figure 13:
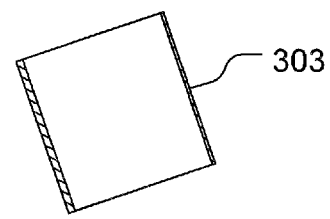

Referring to FIGS. 11-13 in the drawings, the process of removing bushing 303 from bore 301 is shown. Tooling system 501 further comprises a driver 1101 and a sleeve press tool 1103 for removing the already collapsed bushing 303 from bore 301. Sleeve press tool 1103 fits within bushing 303 and driver 1101 fits within tool 1103. A force is exerted on driver 1101, i.e., a worker hammering driver 1101 with a mallet, which in turn disengages bushing 303 from bore 301. In the preferred embodiment, driver 1101 has an outer diameter D3 and tool 1103 has an outer diameter D4 which are the same as outer diameter D4 of bushing 303.

Figure 14:
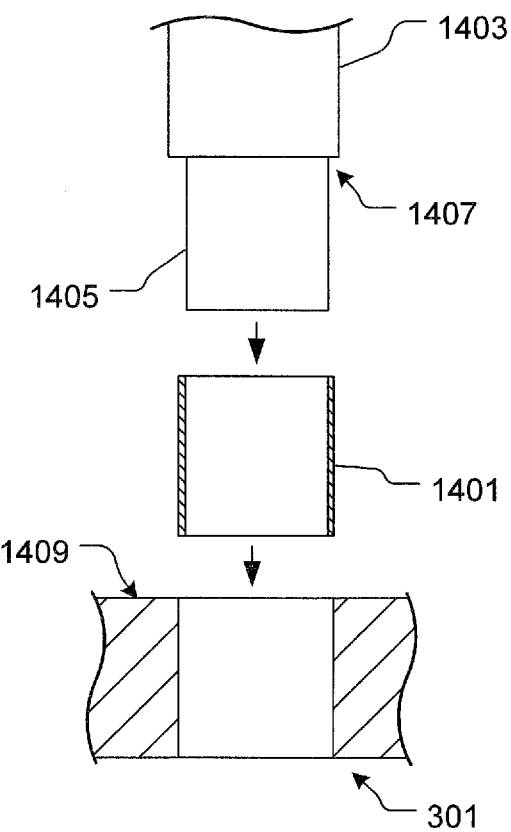
FIGS. 14-16 are front views depicting the preferred method of replacing the bushing with a driver tool.
Figure 15:
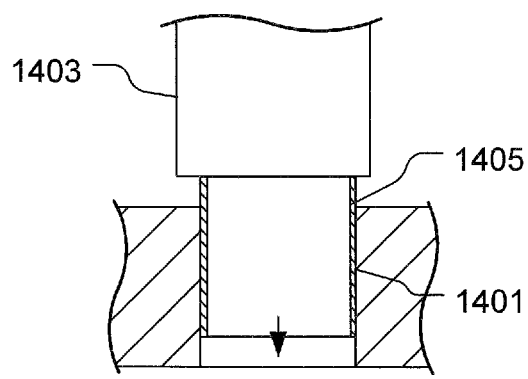
Figure 16:
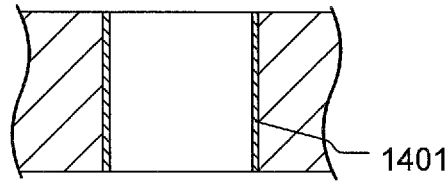

Referring to FIGS. 14-16 in the drawings, the process of placing a new bushing 1401 within bore 301 is shown. A second driver tool 1403 is utilized to drive new bushing 1401 within bore 301. The preferred method includes applying heat to bore 301 and to chill bushing 1401, thus expanding and shrinking the two parts prior to placing bushing 1401 in bore 301. Tool 1403 includes a portion 1405 adapted to fit within bushing 1401 and having an outer diameter D6 equal to the inner diameter of bushing 1401. When assembled, portion 1405 fits snugly within bushing 1401, as shown in FIG. 15. Thereafter, a force is exerted by tool 1403, which in turn causes bushing 1401 to slide within bore 301. Tool 1403 has an edge 1407 which comes into contact with surface 1409 of flange 203, thus stopping tool 1403 when bushing 1401 is in position.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system to remove a bushing from a bore, comprising;
   an alignment tool comprising a substantially cylindrical outer surface, the alignment tool being configured to fit within an inner cavity of the bushing, the alignment tool having a first guide comprising a first substantially cylindrical bore and a second guide comprising second substantially cylindrical bore; and
   a cutter tool configured to selectively, travel via the first guide and the second guide;
   wherein the cutter tool extends radically beyond the outer surface of the alignment tool by a first distance when the cutter tool is in the first guide and the cutter tools extends radially beyond the outer surface of the alignment tool by a second distance when the cutter tool is in the second guide, the first distance being different than the second distance; and
   wherein the cutter tool removes material from an inner surface of the bushing that in turn causes the bushing to collapse inwardly and thereby allowing removal of the bushing from the bore.

2. The system of claim 1, wherein the system is portable.

3. The system of claim 1, the alignment tool further comprising:
   a flange; and
   a first port extending through a thickness of the flange and coaxially aligned with the first guide.

4. The system of claim 3, further comprising:
   a sleeve configured to fit within the first port;
   wherein the sleeve receives a portion of the cutter tool.

5. The system of claim 1, further comprising:
   a portable driver system for driving the cutter tool.

6. The system of claim 1, further comprising:
   a third guide configured to receive the cutter tool.

7. The system of claim 1, wherein the first guide and the second guide both extend radially inwardly from the outer surface of the alignment tool; and
   wherein the first guide extends radially inwardly at a greater depth than a depth of the second guide.

8. A system to remove a bushing from a bore, comprising:
   an alignment tool configured to fit within an inner cavity of the bushing, the alignment tool having:
     an outer surface;
     a first guide; and
     a second guide, both the first guide and the second guide extending radially inwardly relative to the outer surface;
   a cutter tool configured to selectively travel via the first guide and the second guide;
   a sleeve configured to fit within a first port, extending through a flange having a thickness, and a second port extending through the thickness of the flange;
   wherein the sleeve receives a portion of the cutter tool;
   wherein the cutter tool extends radially beyond the outer surface of the alignment tool by a first distance when the cutter tool is in the first guide and the cutter tool extends radially beyond the outer surface of the alignment tool by a second distance when the cutter tool is in the second guide, the first distance being different than the second distance; and
   wherein the cutter tool removes material from an inner surface of the bushing while traveling on the first guide and the second guide that in turn causes the bushing to collapse inwardly and thereby allowing removal of the bushing from the bore.

9. The system of claim 8, wherein the system is portable.

10. The system of claim 8,
    wherein the first port is coaxially aligned with the first guide and the second port is coaxially aligned with the second guide.

11. The system of claim 8, further comprising:
    a portable driver system that couples to and drives the cutter tool.

12. The system of claim 1, further comprising:
    a driver for removing the bushing from the bore.

* * * * *